March 18, 1952      C. H. SCOTT      2,589,298
SEDIMENTATION UNIT

Filed Dec. 28, 1946      10 Sheets-Sheet 1

INVENTOR
CHARLES H. SCOTT,
BY
ATTORNEY

March 18, 1952  C. H. SCOTT  2,589,298
SEDIMENTATION UNIT
Filed Dec. 28, 1946  10 Sheets-Sheet 3

INVENTOR
CHARLES H. SCOTT,
BY
ATTORNEY

March 18, 1952

C. H. SCOTT 2,589,298

SEDIMENTATION UNIT

Filed Dec. 28, 1946

INVENTOR
CHARLES H. SCOTT,
BY
ATTORNEY

March 18, 1952 C. H. SCOTT 2,589,298
SEDIMENTATION UNIT
Filed Dec. 28, 1946 10 Sheets-Sheet 9

INVENTOR
C.H.SCOTT,
BY
Arthur Middleton
ATTORNEY

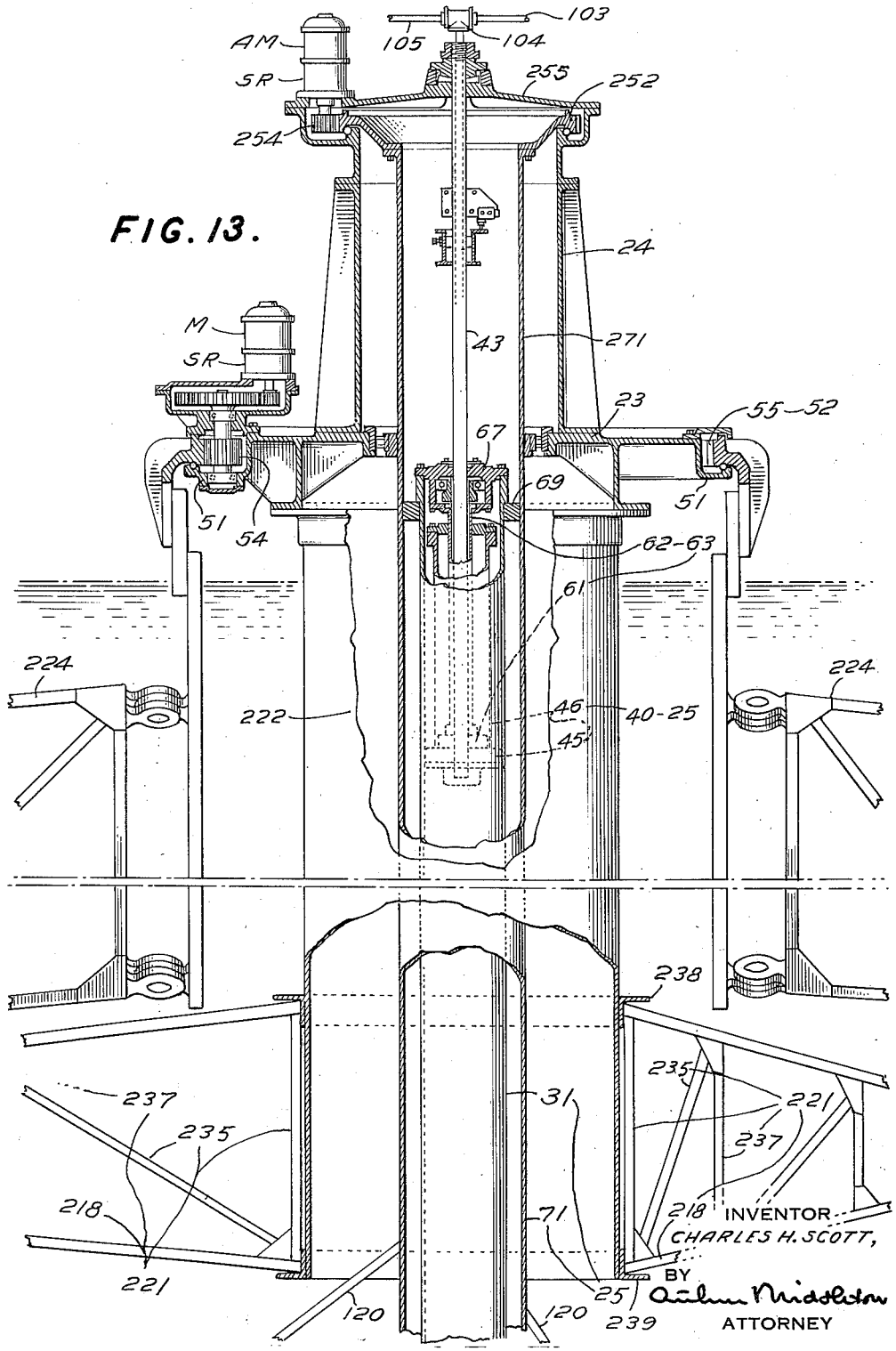

Patented Mar. 18, 1952

2,589,298

UNITED STATES PATENT OFFICE 2,589,298

SEDIMENTATION UNIT

Charles Harold Scott, Westport, Conn., assignor to The Dorr Company, New York, N. Y., a corporation of Delaware Application December 28, 1946, Serial No. 718,944

14 Claims. (Cl. 210—55)

The invention hereof relates to sedimentation units and apparatus of a type in which suitably supported sediment-impelling or sediment-raking mechanism turnable about a vertically-extending axial line is operatively disposed with respect to a floor or bottom section of a tank or basin for impelling settled solids thereupon towards a sediment-receiving or sediment-discharge region of the tank or basin.

The invention according to one phase thereof relates to a novel form of raking mechanism. According to another phase, the invention relates to a liquid-holding tank or basin having a main section and other sections therebelow including a depressed bottom section forming a pit or well which is surrounded by a floor section of intermediate elevation. From the surrounding floor of intermediate elevation sediment progressively passes into the pit as the unit functions.

The depressed bottom section is equipped with truss structure or cantilever beam construction arranged to bridge or span the upper portion of the pit or well. This construction serves as means carrying or affording a hollow column upstanding therefrom to provide at the upper end thereof support for a vertically-extending depending shaft or cage that serves as a rake-arm carrier. This hollow column is also provided to receive therein a vertically-extending shaft from the lower end of which rake arms extend outwardly into the well or pit and thereby into the region over the pit bottom while underlying said truss or cantilever construction.

For each unit as illustrated, there is employed a rotatable—or as otherwise stated—a motivatable set of raking mechanisms for engaging and impelling sedimented solids or sludge from the place of their settlement progressively towards and into a sediment-receiving and discharge means leading from the tank. Each set of raking mechanism for engaging and impelling settled solids or sludge may be broadly and accurately referred to as rotable means turnable about a vertically extending axis. In such mechanisms there is also employed means constructed so that portions thereof at constant elevation derive turnable support from a main supporting bearing member having a stationary carrying member therefor. In the unit having the pit with truss supported column rising therefrom, a stationary carrying member is provided at or proximate the upper portion of the column. In either unit illustrated, a supporting bearing is or may be on a stationary carrying member provided as part of a stationary frame construction positionably associated with respect to the tank.

The sediment-engaging means, in the raking mechanism shown, embodies a main turntable member or main turntable supported at constant elevation by and from the main supporting bearing which has a stationary fixed relation with respect to the tank and thereby to the tank bottom. This main turntable is actuatable by suitable motivating means and as mounted is turnable about a vertical axial line which is herein referred to as the main axial line or axis. From said main turnable member of constant elevation, there depends a hollow torque tube extending downwardly through and from the lower end of the column. There also extends downwardly through and to a region below the lower end of the torque tube, a liftable vertically-extending arm-carrying member or lift shaft supported from its upper end and in turn carrying from the lower end thereof, outwardly-extending rake arms which are turnably actuatable at the several elevated positions of the carrying shaft therefor. The diameter of the liftable shaft is of diameter less than that of the interior diameter of the torque tube and a guide bearing in the form of a flanged annular sleeve— disposed at elevation above the water level of the liquid within the tank or basin—is preferably provided between the upper end of the torque tube and an upper end portion of the liftable shaft whereby the upper portion of the latter shaft has continued concentric arrangement with the upper portion of the torque tube but there is a deliberately avoided introduction of members between the exterior of the shaft and the interior of the torque tube whereby below said guide bearing there is a free and unobstructed space between the interior of the torque tube and the exterior of the shaft. As otherwise expressed the guide bearing or annular sleeve is at elevation higher than that of the surface level of the liquid within the tank, to wit, at elevation higher than that of the overflow edge of an outflow weir means of the tank.

In the construction hereof, the rake arms that extend from the shaft are three in number and in plan are symmetrically arranged. There are also provided as members extending outwardly from the lower end of the torque tube three power-transmission arms the inner ends of which have hinge connections to the torque tubes whereby the outer ends of these power-transmission arms can have required up-and-down swinging movements each about a horizontally-extending axis but except for the hinge construction for permitting the required limited up-and-down swinging movement the connection to the torque tube is such as the latter turns these arms are bodily turned about the main vertically-extending axis referred to. The outer ends of these power-transmission arms have connections with a corresponding outlying portion of a rake arm whereby inward and outward movement of the one relative to the other can take place as the rake arms are lifted but so that there is no lateral movement of any substantial extent permissible as between the outer ends of a particular power-transmission arm and the rake arm to which it corresponds. Provision for such relative inward or outward movement is necessary because of the change of relative position of the outer ends of the power-transmission arms relative to the three corresponding rake arms when the latter are lowered or raised, as the case may be. The inner ends of the power-transmission arms are of constant elevation and the outer ends thereof change in elevation with consequent in or out movement, as the case may be; such movement is permitted to be realized as by link connections provided between the outer ends of the power-transmission arms and corresponding portions of the rake arms.

An important aspect of this invention resides in the fact that due to this triple or tri-armed arrangement of the associated rake arms and hinged power-transmission arms, there is realized a constant self-centering and locking as between the rake arm as a set on the one hand and the power-transmission arms as a set on the other hand, to wit, whereby concentricity between the shaft and the lower end of the torque tube is constantly maintained and whereby one can avoid any necessity of any low steady or guide bearing in submergence between the torque tube and the shaft, to wit, at elevation lower than that of an overflow weir edge within the tank. In the unit described it will be observed that the lower end of the torque tube is in submergence. A bearing member functioning as such in submergence at the low end of the torque tube would be a detrimental feature subject to constant annoyance from an operative point of view. A purpose of this present invention has in view minimizing if not avoiding any objectionable characteristic which would otherwise be encountered if a low steady bearing had to be employed between the low inner end portion of the torque tube and the rake arm lifting shaft. The locking effect accomplished is realized by a construction in which the concentricity is both attained and maintained. The tri-armed arrangement provides a construction insuring that the rake arms occupy a definitely positioned and maintained operative arrangement over and with respect to the floor or tank bottom section served thereby and in the several lifted or elevated positions therefor.

Further aspects and features of the invention will become apparent from the description which follows, particularly when considered in light of the accompanying drawings which constitute a part of this specification.

Respecting the accompanying drawings, it is in order to here point out that as to some of the figures thereof referred to as "broken away," certain sections of the apparatus or parts thereof have been shown as broken away and removed whereby any part or section can be brought close to an adjacent left-behind part or section and whereby the resulting fore-shortened view can appear on the sheet of the drawing where such view is located and this in such a way for illustratively bringing out in a practical manner important features of construction and the coordinated arrangement of the several parts so that the operation thereof will be more readily understandable.

In said drawings:

Figs. 1 and 2 are respectively a plan view and a vertical sectional view, each being a broken away view, of a sedimentation unit of which substantially the entire sediment-receiving floor or bottom of a settling tank or basin is served by a suitably supported horizontally-turnable self-centering raking mechanism embodying (1) a set of three vertically positionable outwardly-extending symmetrically arranged rake arms carried from a liftable vertically-extending central shaft or lift tube; (2) an actuatable rake-arm turning means having a surrounding actuatable shaft or torque drive tube of interior diameter larger than said central lift tube and extending downwardly towards said rake arms; (3) three hinged outwardly-extending power transmission arms overlying said rake arms, power-transmission hinge means between the lower end of the torque tube and the inner ends of the power-transmission arms, and power-transmission link connections between the outer ends of said last-mentioned arms and the corresponding portions of the underlying rake-arms; and (4) an actuatable expansible and contractible means for imparting a lifting movement to the arm-carrying lift tube.

Figs. 3 and 4 are respectively a plan view and a vertical sectional view each being a broken away view, of a sedimentation unit wherein the tank or basin has a depressed central section or pit, the floor portion of which is served by suitable raking mechanism, to wit, which as shown embodies a tri-arm self-centering set of raking mechanism like that of or embodying the teachings of the raking mechanism herein described in connection with the unit illustrated in Figs. 1 and 2. In Figs. 3 and 4 an outer raking mechanism is shown or indicated as supported by a central pier or column that in turn is supported by or embodied in a novel truss or beam construction having support from the wall portion of the pit and extending inwardly therefrom to the column. In said Figs. 3 and 4 there is indicated a central raking mechanism of the rake lifting type constructed along the lines or teachings of the raking mechanism of Figs. 1 and 2, to wit, according to a disclosure in which a turnable torque tube and a liftable rake-carrying shaft are indicated as extending downwardly within and from the hollow column and in which the rake arms carried by the liftable shaft are disposed so as to extend into the region above the floor of the central pit and below the truss or beam members and are functionable at diverse elevations for impelling settled solids within the pit downwardly and into a sump as provided within the lowermost portion of the pit.

Fig. 5 is a vertical view partially in section showing portions of the arm-lifting shaft with rake-carrying arms and connecting means between the lifting shaft and the inner ends of the rake-carrying arms and also showing a lower portion of the surrounding torque drive tube, an intermediate carrying structure extending outwardly from the torque tube, an inner end portion of an outwardly-extending power-transmission arm, and an indicated hinge connection between the carrying structure and the power-transmission arm.

Figure 11:
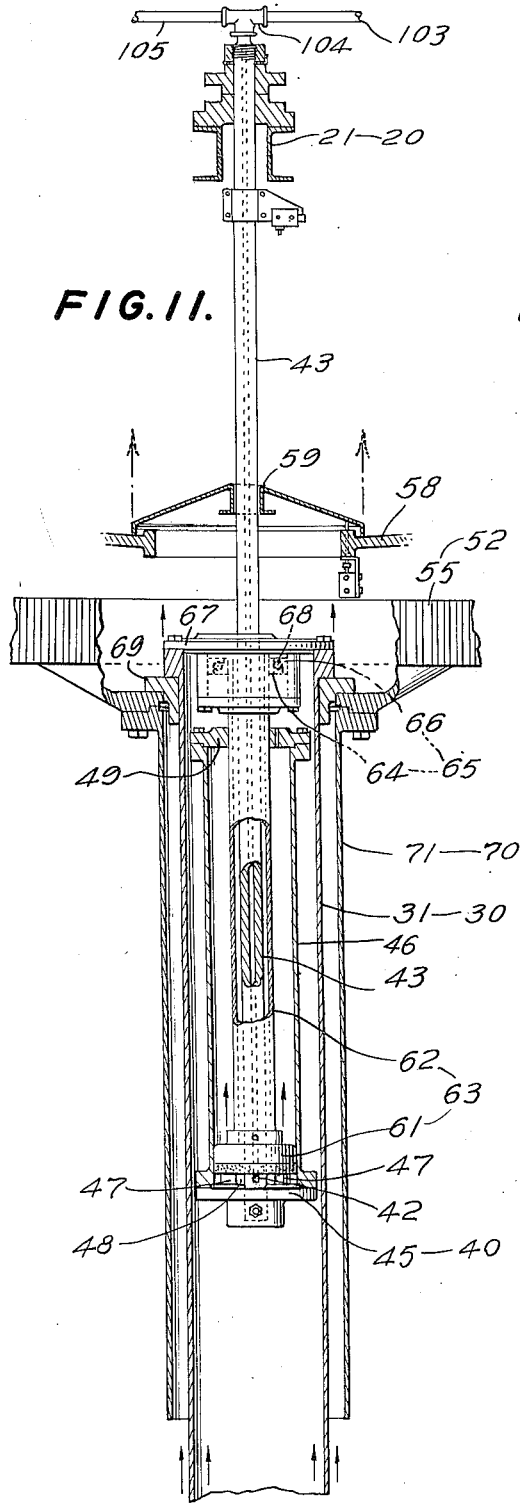
Figure 12:
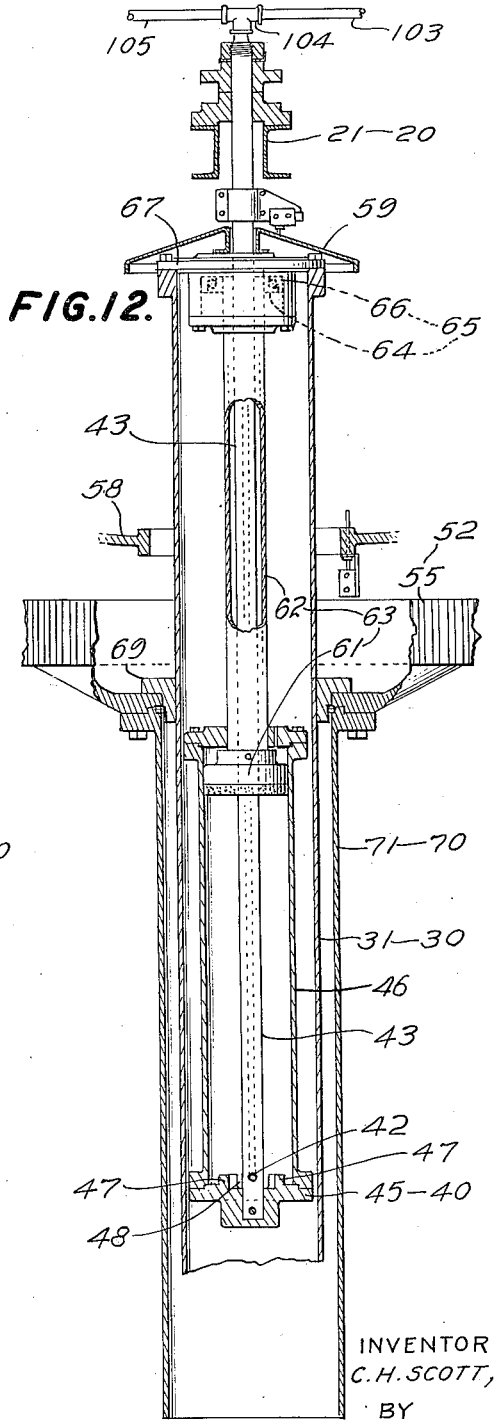

Figs. 11 and 12 are partial vertical sectional views of an expansible and contractible lifting means employed for moving to different elevations the lifting shaft from which the rake arms are carried; in these views Fig. 11 illustrates the contracted position of the members of lifting means, namely, the condition of the lifting means for the lowest sediment-engaging or raking positions of the rake arms therefor, while Fig. 12 illustrates the most expanded position of the members for the highest or most elevated position for the rake arms.

Fig. 13 is an elevational view partially in section indicating in illustrative detail a typical driving arrangement for a long upper set of hingedly mounted outer rakes of Fig. 4 and the lifting and actuating mechanism for the lower set of smaller liftable rakes of Fig. 4, to wit: that set of rakes which is in the region below that of the truss or beam members collectively supporting a hollow pier member rising therefrom.

Reference is now made to the drawings in detail:

General—re: Unit of Figs. 1 and 2

By these figures a sedimentation tank or basin 10 is illustrated embodying a floor or bottom portion 11, a marginal wall 12 rising from said bottom portion, a marginal launder 13 for receiving supernatant liquid overflow passing thereinto from the overflow weir or weir edge 14; an effluent outflow 15 leading from the overflow launder 13; a sludge- or sediment-receiving and discharge section provided by a sludge sump or inverted cone-shaped depressed section at 16 and a discharge conduit 17 leading from the sump to a region outside of the unit.

Liquid to be treated for removal therefrom of settleable material is supplied to the upper central portion of the tank through the medium of a feed-supply means terminating in a feed-distributing well 18 having apertured feed-discharge openings at 19.

Also associated with the tank and constituting a part of the sedimentation unit as a whole is a frame structure 20 stationarily positioned with respect to the tank. This frame structure serves as a support for a portion of said supply means and feedwell thereof, it also serves as a support for a motivated sediment-raking mechanism collectively designated 25 and constituting the means by which settled solids on the tank bottom can be impelled towards and into a sediment-receiving sump provided in or by the bottom.

The sediment-raking mechanism collectively designated 25 embodies sub-sets of members or functioning mechanical elements which may be designated as follows:

1. Motivated power-transmission gearing 53 embodying a bull gear or wheel 52 constituting a main turntable which is turnable about a vertically-extending main axial line and which is mounted on a stationary bearing member 51 that derives carrying support from the I-beams 22 of the main frame structure 20. Anti-friction balls or rollers may be provided as at 56 between the supporting and supported members 51 and 52 of a main turntable construction 50 thus provided thereby.

2. An expansible and contractible lifting means 40 embodying:

(a) a stationary lifting cylinder 46 of constant elevation having a low cylinder head 45 and cylinder wall rising therefrom, which cylinder 46 derives carrying support through the medium of a central depending carrying tube 43 concentric with said axis of which the upper end derives carrying support from the channel members 21 of the frame structure 20 while the lower end of the depending carrying tube 43 extends within the cylinder and has rigid connection with the low head 45 of the lifting cylinder, and (b) a liftable piston element 63 having an annular head 61 slidably fitting the interior of the cylinder wall and the exterior of the depending tube and a hollow piston rod 62 rising from said annular piston head. At the upper end of this piston rod 62 there is carried a liftable base or supporting bearing member 64 of an auxiliary turntable construction 65 having a turnably supported bearing 66 carrying an annular cap 67 constituting an auxiliary turntable that is vertically liftable. Balls or rollers may be provided as at 68 between the raceways of the supporting and turnably supported bearing members 64 and 66 of the auxiliary turntable construction just referred to.

3. A liftable vertically-positionable sediment-raking element 30 embodying a vertically-extending liftable arm-carrying shaft or lift tube 31 equipped with intermediate arm-carrying members collectively designated 32 extending from the lower portion of the lift tube and a set of outwardly-extending rake-carrying arms 33 carried from said intermediate members 32. The lift tube or shaft 31 derives its liftable support from the auxiliary turntable 67 above referred to. The auxiliary turntable 67 in turn derives support (1) through the medium of the depending tube 43 which derives carrying support therefor from the channel members 21 of the frame construction 20 which is fixedly positioned with respect to the tank, and (2) through the medium of a stationarily supported lifting cylinder 46 which is secured to the lower end of the tube 43 and wherein there is located the liftable piston 63 having the rising hollow piston rod 62 at the upper end of which there is carried the liftable base or supporting bearing member 64 on which there is mounted through the medium of anti-friction bearing members 68 the turnably supported bearing member 66.

4. Power-transmission mechanism between the bull wheel or main turntable 52 on the one hand and the rake-carrying arms 33 on the other hand is collectively designated 70 and may be referred to as the bull wheel driven or motivated rake-arm turning mechanism. This mechanism embodies the torque tube 71 which is driven by and has depending carrying support from the bull wheel, an outwardly-extending frame structure generally designated 120 of Figs. 1 and 2 or of Figs. 3 and 4 secured to and extending from the lower end 72 of the torque tube and hinged outwardly-extending power-transmission arms 80 of Figs. 1 and 2 or of Figs. 3 and 4 of which the inner ends have hinge connections at 73 to the outlying members of said outwardly-extending frame structure 120 while the outer or swinging ends of the power-transmission arms have suitable connections as by links 90 to the corresponding portions of the underlying rake arms 33 of Figs. 1 and 2 or of Figs. 3 and 4.

Figure 1:
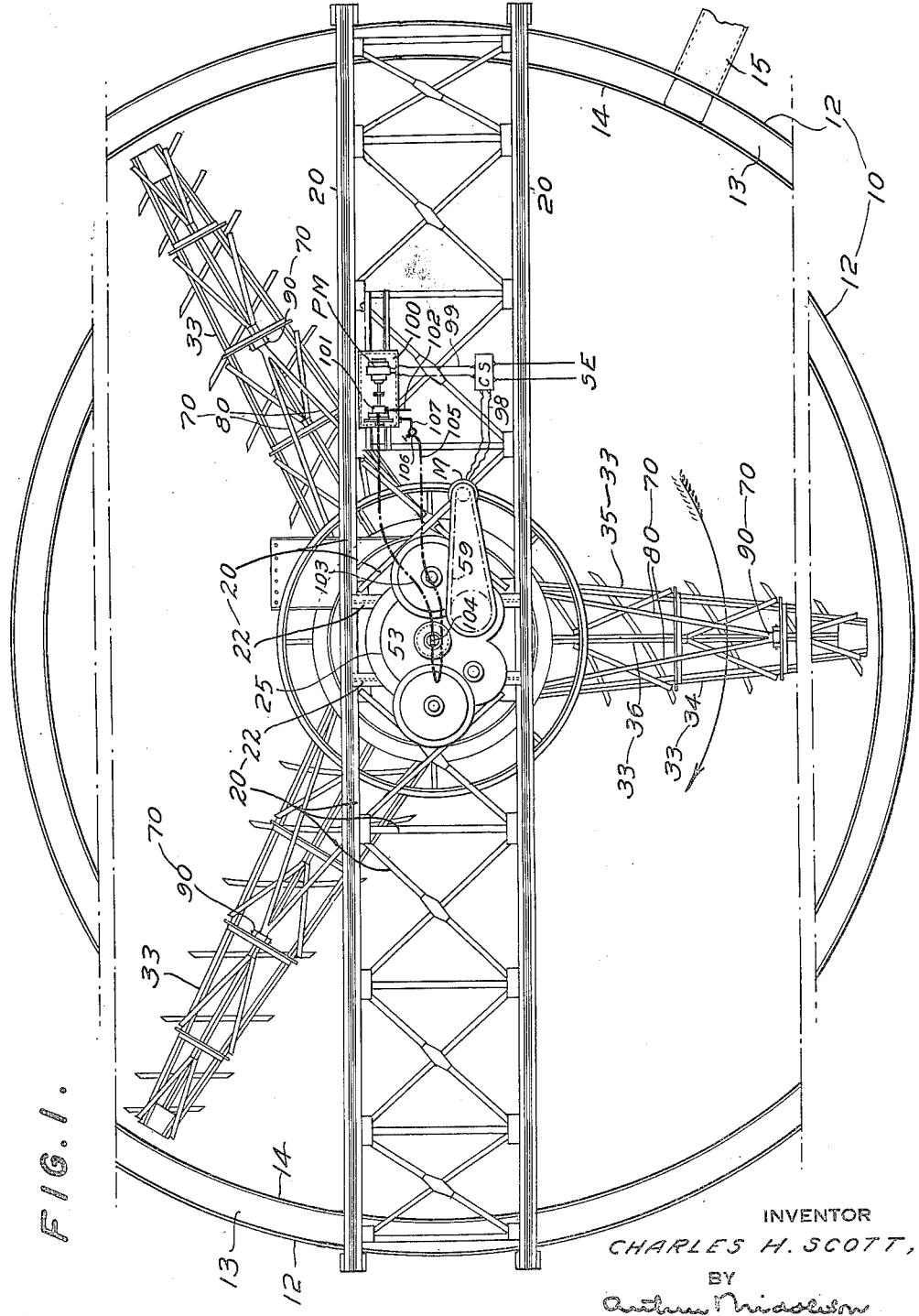
Figure 2:
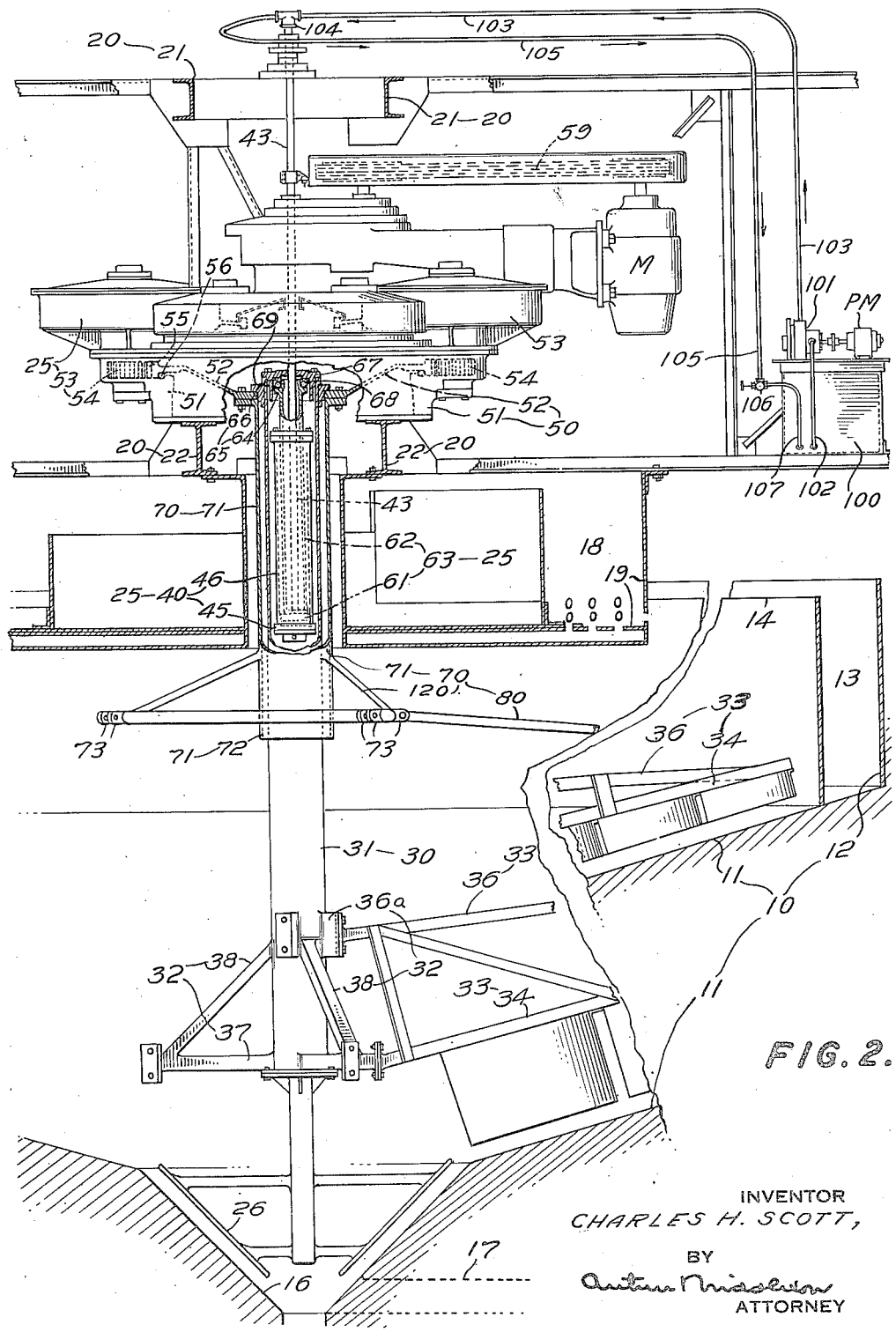
Figure 3:
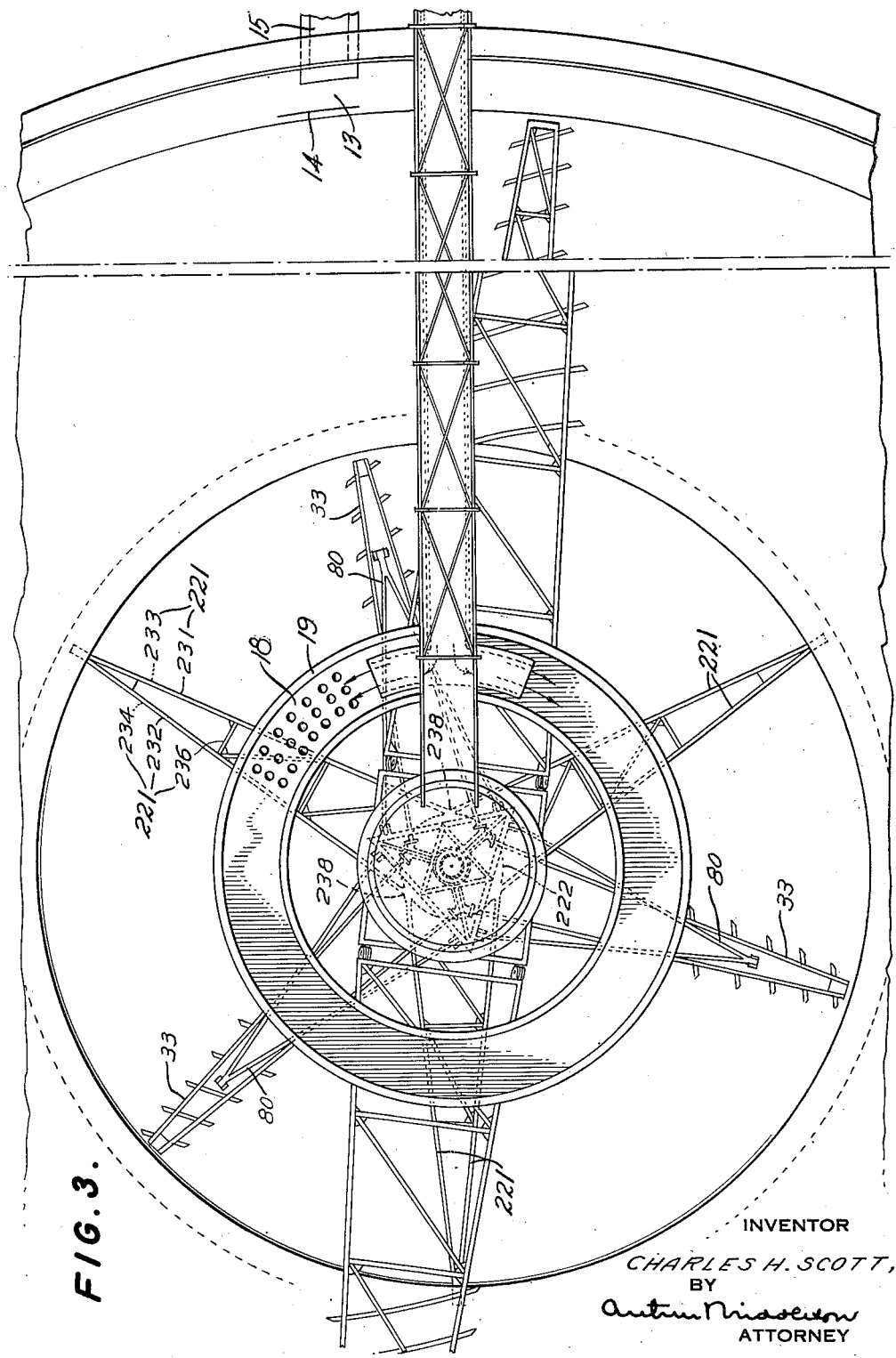
Figure 4:
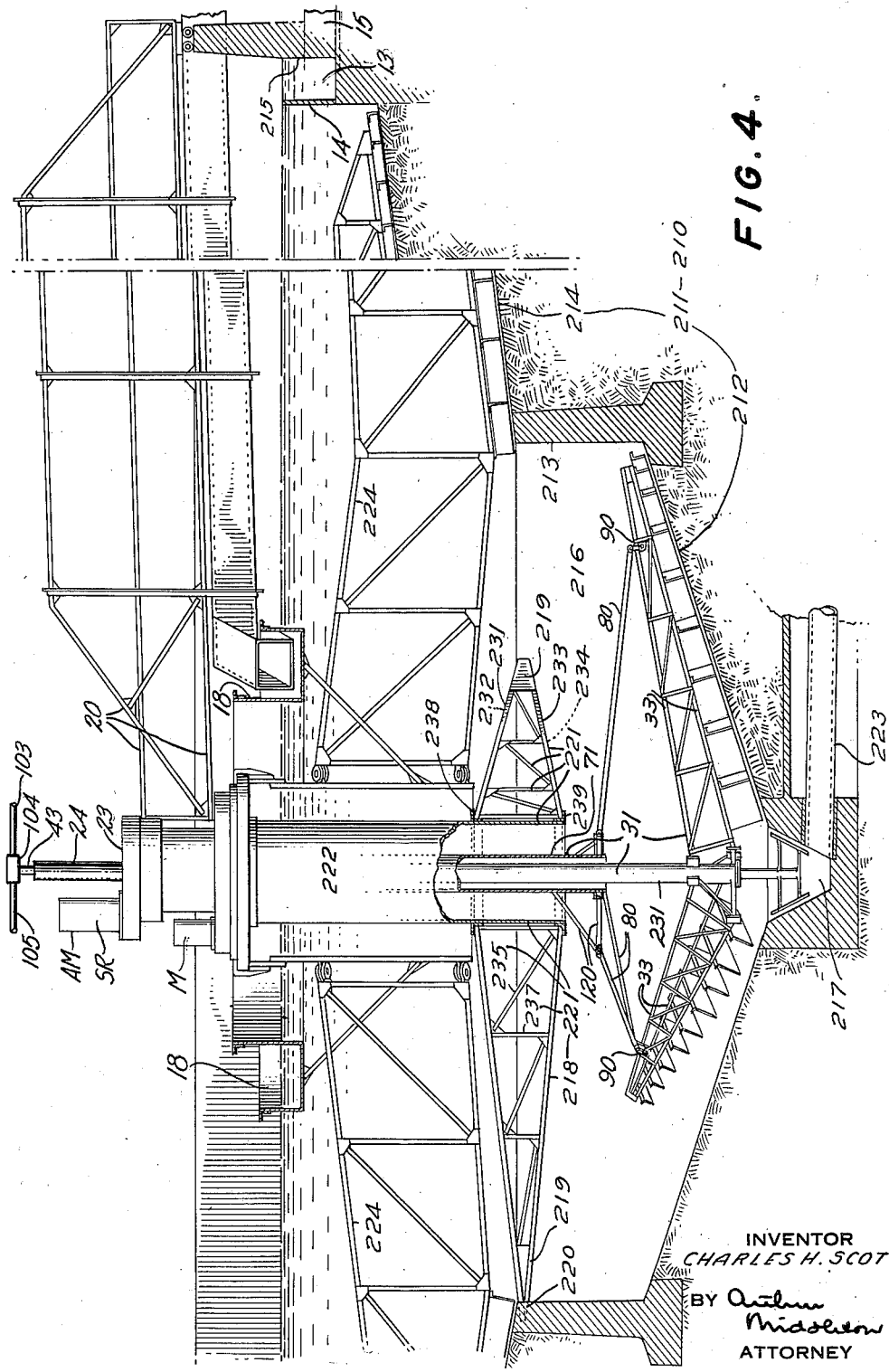

The frame structure 20 also serves as a support for a liquid-supply means provided as by an oil or liquid-supply tank 100 and an associated pump 101 which is connected through the medium of suitable piping so as to supply pumped oil or other liquid from said supply tank 100 to and through the depending central tube 43 and so as to deliver the same under pressure into the stationary cylinder of the expansible and contractible means 40, to wit, in the region above the cylinder head 45 but below the piston head 61, whereby the pressure liquid thus supplied can effect a lifting of the piston as a movable element of the expansible and contractible lifting means and thereby the auxiliary turntable construction and the rake-carrying arms 33 which are indirectly carried from the auxiliary turntable construction through the medium of the liftable arm-carrying shaft 31 of Figs. 1 and 2 or of Figs. 3 and 4.

The depending torque tube 71 of Figs. 1 and 2 or of Figs. 3 and 4 has an interior diameter substantially larger than that of the diameter of the exterior portion of the depending arm-carrying shaft 31. A flanged annular guide sleeve 69 at elevation higher than that of the overflow weir edge 14 is provided between the upper interior portion or the torque tube 71 and the exterior of the arm-carrying or lift shaft 31. This guide is preferably of bronze and serves not only as a guiding member but also as means for establishing and maintaining concentricity as between the upper end of the torque tube and that portion of the lift shaft at that particular elevation. A characterizing feature of the rake construction and driving mechanism therefor resides in the embodiment and employment of the three symmetrically-arranged rake arms as arms 33 of Figs. 1 and 2 or of a corresponding type employed in Figs. 3 and 4 and the three symmetrically-arranged overlying power-transmission arms as 80 of Figs. 1 and 2 or of Figs. 3 and 4 with the hinge construction and link connecting elements referred to whereby there is realizable and effectively obtained an automatic self-centering of the lower end portion of the lift shaft 31 of Figs. 1 and 2 or of Figs. 3 and 4 with respect to the lower interior portion of the hollow torque tube 71 of Figs. 1 and 2 or of Figs. 3 and 4 and which self-centering arrangement is not only established but is preserved for each and all elevations of the rake arms and as more specifically expressed, while the rake arms carrying the rakes are being turned about the aforementioned main axial line from the motivated bull wheel or gear and the torque tube depending therefrom which turning movement of the rake-carrying arms is being effected through the medium of the hinged outwardly-extending power-transmission arms and finally the link connections to the rake arms, all of which members or parts just referred to constitute a tri-set of operatively connected members. It will be noted that the raking mechanisms which include the rake arms 33 and the power transmission arms 80 are substantially identical in construction and that the detailed description of the raking mechanism in the forms shown in Figs. 1 and 2 is substantially identical with that which is employed for the sediment-raking mechanism of Figs. 3 and 4.

Reverting to the motivating power-transmission gearing 53, it will be noted from an inspection of Figs. 1 and 2 and particularly from Fig. 2 that a motor M may be provided with a housing physically connected to and carried from a section of the casing structure for the motivated gearing 53. Power from the rotor of the motor is transmitted to an initially driven gear of the motivated mechanism 53, as for example, through the medium of pulleys and belts 59 the latter of which are indicated by dot and dash lines in Figs. 1 and 2. The thus motivated power-transmission gearing 53 has a gear or gear elements 54 drivingly engaging a peripheral gear 55 of the bull gear or wheel 52 as is indicated in Fig. 2.

As to the supply means 100 and pump 101, it will be noted that the member 100 may be a tank preferably holding oil from which by means of the pump 101 oil is pumped according to operative requirements from the lower interior portion of the tank or container 100 through the medium of a suction pipe line 102 and is delivered under pressure from the pump through the pressure line 103 into a pipe connection 104 thence into the upper end of the stationarily-supported depending tube 43 by which the lifting cylinder is carried and from which tube liquid under pressure is deliverable into said cylinder between the cylinder head 45 and into the region at the underside of the annular piston head 61 of the liftable piston element 63. A return or bleeder pipe line leads from the pipe connection 104 and embodies a pipe section 105, an adjustable bleeder valve 106 and a terminal pipe section 107 that delivers the returning or bleeder liquid back into the supply tank 100. The bleeder line thus provided functions as means for controlling the outflow of the bleeder or release liquid from the region between the cylinder and piston heads just mentioned back into the tank particularly as and when the lifting load within the lifting means is no longer required, to wit, at a time when the parts of the expansible and contractible lifting means 40 are assuming the contracting position relative to each other. The pump 101 is actuated by and from a pump motor PM.

The motors M and PM are preferably but not necessarily embodied in an automatic system according to which electrical energy for operating motors is controllably supplied from a suitable source of electrical energy generally designated SE through a control system generally designated CS from which there is a control supply of power through one set of wiring to the motor M and through another set of wiring to the motor PM that actuates the pump 101 according to operative requirements. In other words according to the control system just referred to during normal raking load operations the motor M is actuating the sediment-raking mechanism 25, to wit, in the general normal or low operating position for the rake-carrying arms 33 thereof. If, however, the raking load becomes abnormally excessive this control system CS comes into play to start the operation of the motor PM for effecting of the delivery of pressure liquid, to wit, oil under pressure from the pump into the expansible and contractible lifting mechanism 40 for expanding the latter and thereby effecting an automatic lifting of the liftable element thereof and a consequent upward movement of the lift tube 31 from which the rake-carrying arms 33 extend. When the excessive rake load conditions have been overcome there is an automatic stopping of the motor PM and this is followed by a permissible lowering of the previously lifted rake-carrying arms 33 due to a progressive contracting of the expansible and contractible lifting means, which contracting is permited to take place because of the progressive release of the oil or other liquid through and from the bleeder valve 106.

Also in the electrical control system CS provision is preferably made for automatic stopping of the motor M and thereby stopping of all turning movement of the raking mechanism should the load upon the latter become sufficiently excessive, to wit, to an extent whereby the motor M or other mechanism actuated therefrom might be otherwise damaged. Electric wiring from the control system CS to motor M is indicated as 98 while electric wiring from the control system CS to the pump motor is indicated as 99.

In short, however, according to the control system just referred to during normal raking load operations the motor M functions through the medium of the belt-drive 59 and the motivated power-transmission gear 53 to effect a horizontal turning of the depending torque tube 71 and therefrom to the underlying rake-carrying arms 33 through the medium of the hinged outwardly-extending power-transmission arms 80 of Figs. 1 and 2 or of Figs. 3 and 4 of which the outer ends have link connections 90 whereby said arms 33 as a set have horizontal turning movement about the main vertically-extending axial line and whereby they are thus operable in any position of elevation therefor as well as at any and all times when being changed from one elevation to another.

Also during the time when the rake load sufficiently exceeds a normal raking load but is not sufficiently excessive to damage the motor or parts actuated therefrom the motor M continues to operate and thus functions to effect the continued turning of the rake arms but under such abnormal overload conditions as those just stated, the control system CS is such as to cause the starting up operation of the pump motor PM and thusly the pump 101 whereby to send pressure liquid into the expansible and contractible lifting means 40 for effecting a raising of the rake-carrying arms 33 with a consequent lessening of the raking load. This upward movement of the raking arms continues until the abnormally excessive overload conditions have been overcome at which time the control mechanism causes the pump motor to automatically stop and a progressive lowering of the rake arms can follow.

Details of construction of the liftable vertically-positionable sediment-raking element 30 that embodies the lift tube or rake-arm carrying shaft 31 and of the motivated or bull wheel driven rake-arm turning means 70 that embodies the torque tube 71 and the parts driven therefrom requisite for imparting turning movement to the rake will hereinafter be set forth in greater particularity in connection with Figs. 5 to 10 inclusive.

Likewise, details of construction of the expansible and contractible lifting means 40 and the relationship of certain parts thereof with respect to certain other parts of the raking mechanism as a whole will be set forth in further detail in connection with Figs. 11 and 12.

*Sediment-raking element 30 and rake-arm turning means 70 (Figs. 5 to 10, inclusive)*

Figure 5:
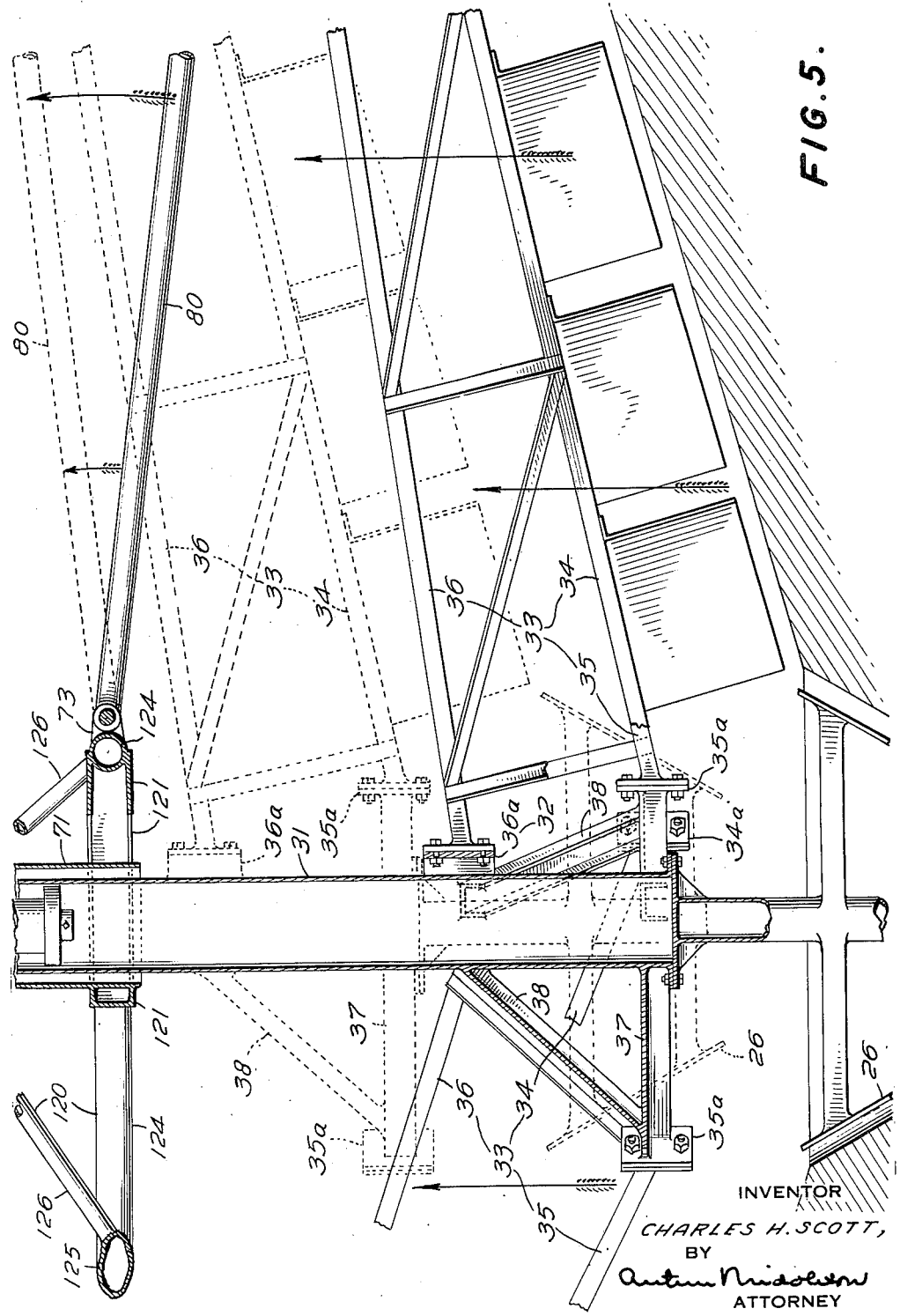
Figure 6:
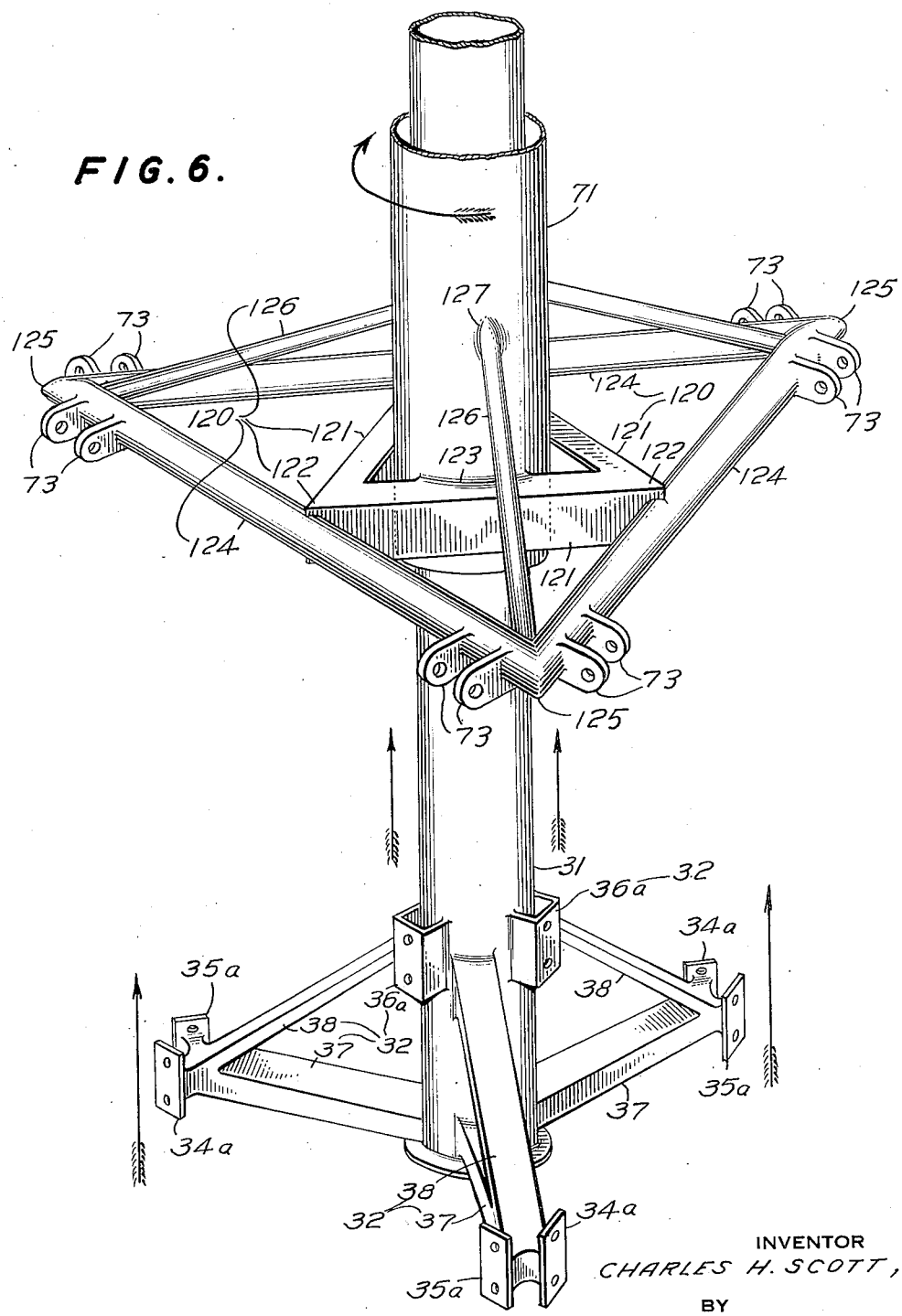
Fig. 6 is a perspective view showing a lower end of a liftable rake-arm carrying shaft with rake-arm supporting members extending therefrom, and also showing the lower end portion of the surrounding torque tube with the carrying structure extending outwardly therefrom and certain members of the hinges by which power from the torque tube is imparted to the power-transmission arms.
Figure 7:
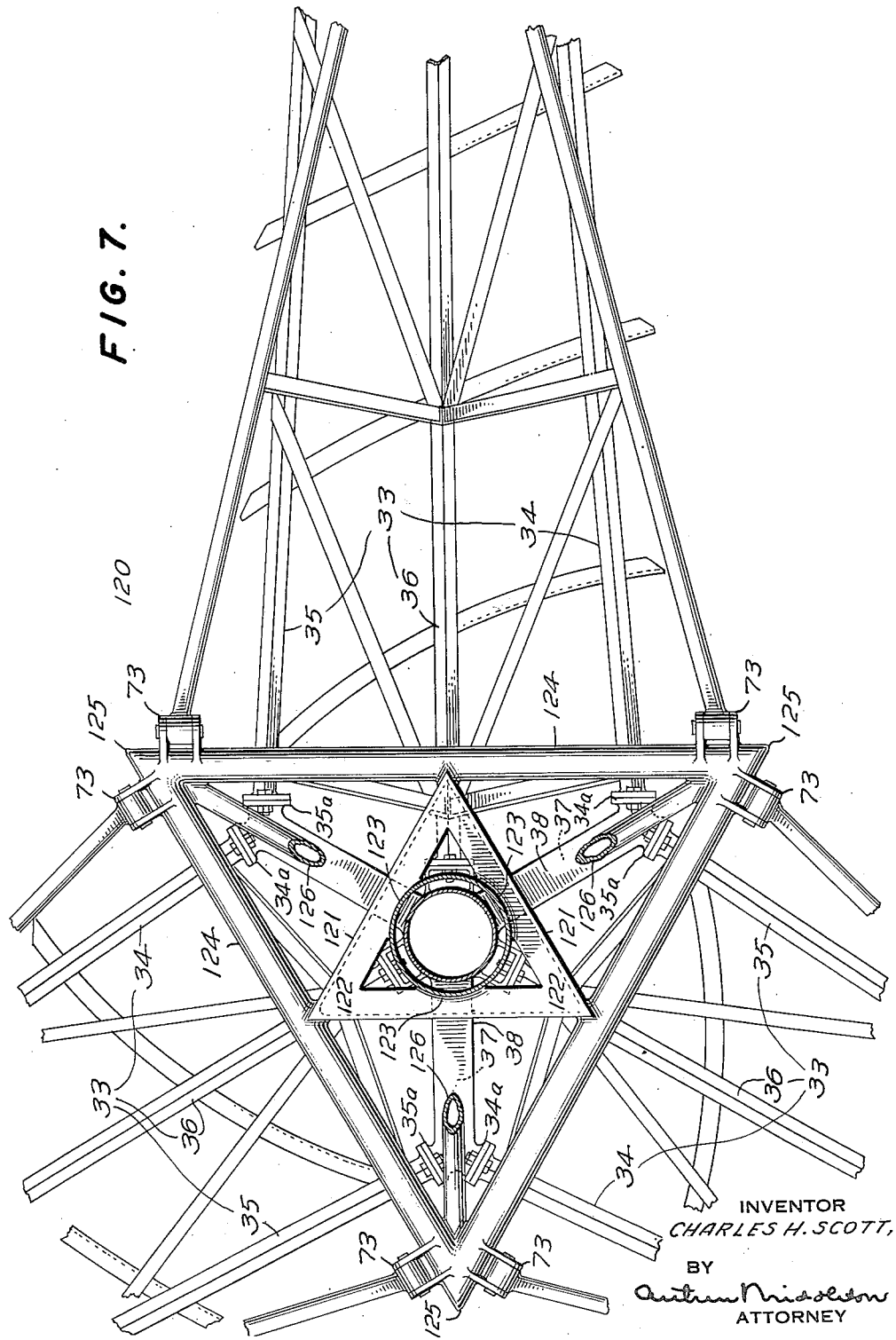
Fig. 7 is a plan view of parts shown in Figs. 5 and 6.

From Figs. 5 to 7 inclusive one will note the arm-carrying shaft or lift tube 31 is provided with arm-connecting members welded thereto and extending upwardly therefrom and which are collectively designated as intermediate means 32. This intermediate means embodies three sets of outwardly-extending carrier elements which in plan are located at 120 degrees with respect to each other and each of which sets thus arranged is made up of a horizontal strut or compression member 37 and a downwardly- and outwardly-extending brace or tension member 38 and is provided at the outer end thereof with a pair of upwardly-extending connecting flange portions 35ᵃ and 34ᵃ that in plan have outer faces disposed at 240 degrees with respect to each other whereby the inner ends of a rear longitudinal 35 of one rake arm 33 can be connected to the flange portion 35ᵃ and the inner end of a forward longitudinal 34 of a succeeding rake arm can be connected to a flange portion 34ᵃ, to wit, whereby the lower longitudinals of the several rake arms 33 can be connected as shown in plan in Fig. 7. The intermediate means 32 also comprises an upwardly-disposed apertured connecting member 36ᵃ which in plan is located 60 degrees with respect to the horizontal compression members 37. The inner end of the upper longitudinals 36 of the rake arms 33 are respectively connected to the connecting members 36ᵃ. From the lower end of lift shaft or tube 31 there downwardly extends a sump rake 26 liftable with the shaft but disposed at elevation sufficiently low to operate in the sump 16.

In Figs. 5 to 10 inclusive, one will readily appreciate the construction of the means for imparting driving movement to the rake arms from the drive tube or depending torque shaft 71. It will be noted that to the drive tube or torque shaft 71 there is secured and carried from the lower end thereof an outwardly-extending frame structure collectively designated 120 that includes an inner triangular member made up of three pieces of channel members 121 weld-connected at their ends or apex portions 122 and of which channel members the flanges extend inwardly and at 123 are welded to the lower exterior portion 72 of the drive tube 71, an outer or outlying set of horizontally-extending tubular members 124 that are weld-connected at their ends or apex portions 125 and of which tubular members the intermediate portions thereof are connected by welding to the apex portions 122 of the inner triangular member. Downwardly and outwardly extending tension members 126 are provided of which the upper inner ends 127 thereof have weld-connections to the tube 71 while the lower outer ends thereof have weld-connections to the apex portions 123 of the outer triangular member formed by the tubes 125. In this way a rigid and strong driving member or outwardly-extending construction of triangular formation is provided at the lower end of the torque tube 71.

Figure 8:
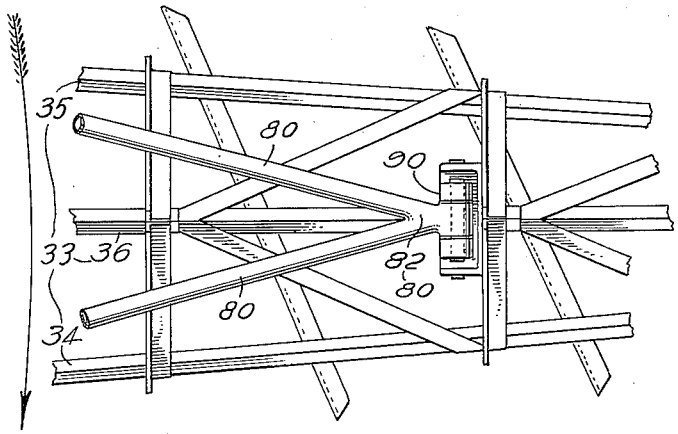
Fig. 8 is a plan view illustrating how a link connecting means is employed at and between the outer ends of the power-transmission arms and underlying portion of a rake arm.
Figure 9:
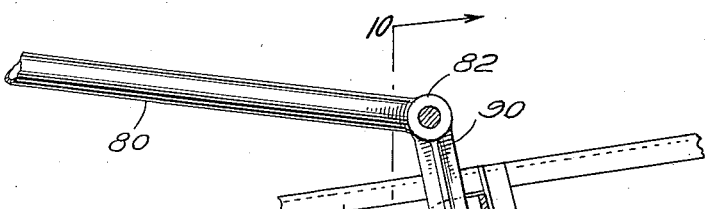
Fig. 9 is a vertical view, partially in section, of the members shown in Fig. 8.
Figure 10:
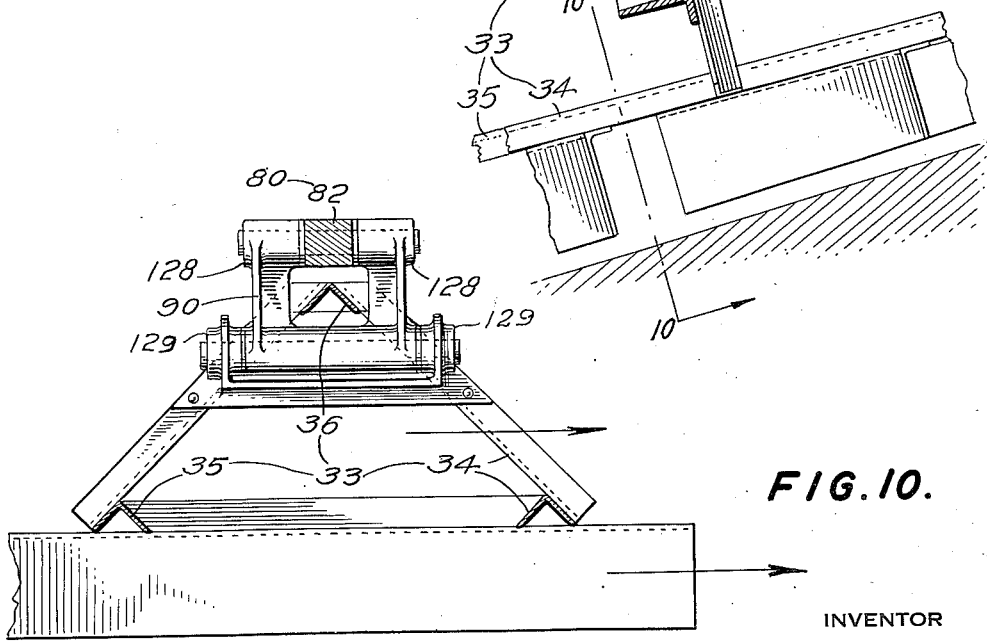
Fig. 10 is a vertical transverse sectional view of the parts shown in Fig. 9, to wit, a view as taken on transverse planes indicated by the broken line 10—10—10 looking in the directions indicated by the arrows.

From Fig. 6, particularly when taken into consideration with Figs. 5 and 7, there will be seen the horizontally-spaced sets of hinge elements provided by the hinge connections at 73 of which the pintle axes extend horizontally and serve as part at least of the hinge connecting means provided between this outwardly-extending structure 120 carried by the torque tube and the corresponding sets of three outwardly-extending power-transmission arms 80 constituting three power-transmission members of V-formation of which the open ends of the V are innermost and have hinge connections through the medium of the hinge members 73 carried from the torque tube, and of which power-transmission arms the converging outer ends 82 are connected through the medium of the link constructions 90 to underlying portions of the corresponding rake arms, to wit, in outlying regions of the respective upper longitudinals 36 of the rake arms. In this connection one may well note the link embodiment as illustrated by Figs. 8, 9 and 10. A transverse cross-section of a rake arm and of the link construction just referred to is shown in Fig. 10. In connection with the rake arms shown, it will be here pointed out that each rake arm is of a skeleton type formation and that as shown it includes the forward and rear lower longitudinals 34 and 35 and an upper longitudinal 36 all of which are connected into a relatively rigid construction in a manner well-known by members such as diagonals, cross bracings and even raking blades which are provided as depending members extending from the lower longitudinals.

Fig. 8 shows in plan the link connection just referred to.

Fig. 9 is a vertical, longitudinal sectional view clearly showing the same link connection. The vertical transverse view of Fig. 10 illustrates the manner in which the link 90 thereof has pivotal connection for the lower end portion thereof through the medium of horizontally-spaced bearing members 129 carried on the arm. The upper swinging end of the link 90 is forked and provides horizontally-spaced bearing members or portions 128 whereby to receive the outer end 82 of the power-transmission arm 80 corresponding thereto and in a manner whereby there is no lateral play as between the outer ends of the power-transmission arms on the one hand and the rake arms actuated thereby on the other and to which the several link constructions just described correspond.

Because of the particular mode of mounting the three power-transmission arms from and with respect to the torque tube and the link connections thus provided between the outer ends of the power-transmission arm and the corresponding three underlying rake arms, there is realizable a rigid, self-centering arrangement of parts whereby the lift tube or arm-carrying shaft 31 on the one hand and the lower portion of the torque tube 71 on the other hand, will at all times be maintained and be retained in concentric relationship with respect to each other, through the tri-sets of associated hinged power-transmission arms and rake arms.

*Expansible and contractible lifting means 40 (Figs. 11 and 21)*

The important features of parts of the lifting means have heretofore been described in a general manner but certain details thereof can advantageously be referred to at this time.

From that which has been presented, one will readily appreciate that the bull wheel or main turntable 52 has turning movement at constant elevation about a vertically-extending axial line with which the lifting cylinder supporting tube 43 is dependingly carried from the channel members 21 of the frame structure 20. As previously pointed out the cylinder head 45 of the lifting cylinder 46 is connected to the lower end of this tube so as to be carried thereby. It is also pointed out that the lifting means 40 includes the cylinder 46 as a stationary element thereof and that the liftable element of the means 40 is provided by the lifting piston 63 which includes the annular piston head 61 and the upwardly-extending hollow piston rod 62 that surrounds the depending tube 43; also that the annular piston head has sliding and fitting engagement with the interior of the cylinder 46 and the exterior of the depending tube 43 through the latter of which pressure liquid is supplied into the region between the cylinder head 45 and the underside of the annular piston head 61.

In order that a liquid-receiving space 48 shall at all times exist between the cylinder head and the piston head spacing or stop members 47 are provided, between said heads. The depending tube 43 is provided at the low end thereof with oil discharge openings 42 through which pressure oil or other liquid can be forcibly delivered into the space 48 thus left and provided between the said cylinder and said piston head even when the latter is in the lowermost position therefor and in this connection it will be noted when the piston head is being lowered the previously used pressure liquid can outwardly flow as bleeder liquid into a bleeder line leading back to the original source of supply, to wit, back into the tank 100.

Also in connection with the annular piston, it has here been pointed out that suitable packing as piston rings or leather rings is provided to prevent the leakage of pressure liquid upwardly past the piston.

In the construction shown a guide ring or head 49, see Figs. 11 and 12, may be provided at the upper end of the lifting cylinder and about the exterior of the upwardly-extending rod 62 of the liftable piston 63. This head 49 should have a loose fit or aperture therethrough to permit the outflow or inflow of air or other fluid as and when the plunger is being raised or lowered, as the case may be. The supporting bearing member 64, see Fig. 2 as well as Figs. 11 and 12, previously referred to is carried from the upper end of the hollow piston rod through the medium of any suitable carrying structure provided at or on the upper end of the piston rod. The annular guide sleeve 69 heretofore mentioned is provided whereby the upper end of the lift shaft 31 and the upper end of the torque tube 71 are maintained in concentric relationship, this is clearly shown in these figures and it will also be noted that the depending torque tube 71 is secured as by bolts to the bull gear from which it depends and by which it is carried. In these figures there will also be seen at 58 a portion of the housing for the gearing 53 and a liftable hood or cover 59, normally occupying the position shown in Fig. 11 but which is raised as shown in Fig. 12 as and when the piston is raised.

*Unit of Figs. 3 and 4*

The tank or basin of this unit is designated as 210; it has a bottom collectively designated as 211 providing a lowermost central floor or bottom section 212 with an intermediate wall 213 rising therefrom; an outlying floor or bottom section 214 of intermediate elevation extending outwardly from the outer edge of the intermediate wall 213 with a marginal wall 215 rising from and defining the marginal limits of outlying floor section 214. The upper edge of the wall 215 is herein referred to as an edge of high elevation. In short, the tank or basin of this unit provides that which is properly defined as a main settling tank or basin having a large central sump or sediment-receiving pit or well 216 disposed for receiving sedimented material passed thereto or thereinto from a main outlying inwardly-sloping settling floor 214. The central pit or well 216 is of cross-sectional area sufficiently large to have advantageously employed a central raking mechanism for conveying sedimented material on the floor thereof into a central sludge sump or cone 217 from which sedimented material or sludge rakingly conveyed thereinto is hydraulically passed from the sump 217 by the discharge conduit 223 for delivering the conveyed material to a region outside of the tank or basin. The pit floor 212 preferably has a substantial inward and outward slope towards the sump 217. An effluent launder 13 has a high overflow weir edge 14 and an effluent conduit 15 leads from the launder to the exterior of the tank.

In the unit of Figs. 3 and 4, there is provided a central form of frame structure which serves to afford support for a relatively large sedimented impelling raking mechanism provided for raking and progressively impelling sedimented material along and from the diverse sections of the outlying floor or bottom 214 into the pit 216. The pit is of sufficient size whereby as above indicated the central raking mechanism therefor is not only advisable but generally is required for assuring the passing of the sedimented material of the floor 212 thereof into the sump 217.

In order to provide the framework for this purpose, resort is made to the employment of three radially-extending truss or carrying beam members individually numbered 218 of which the outer ends 219 are fixed in and are carried by the upper edge portion 220 of the rising intermediate wall 213 while the inner or meeting end portions of the truss or beam members are connected whereby to provide a rigid and strong plural arm truss construction, to wit, a three-arm truss type of framework collectively designated as 221 but which includes or is composed of the individual members 218. An upstanding tubular column or hollow rising pier member 222 has secured to or is embodied in and constitutes part of the truss according to the way one views the resulting construction whereby the column or rising pier member has a rigid fixed position with respect to the intermediate wall by which it is indirectly supported.

In the construction as shown in Fig. 4, it will be noted that there is substantial height or depth of space between the pit floor 212 and at the underside of the truss arms 218.

The raking mechanism for serving the outlying floor portion 214 is collectively designated as 224. The raking mechanism for serving the central floor portion 212 of the lowermost elevation is substantially a duplicate of the motivated mechanism 25 as already described in connection with the unit of Figs. 1 and 2. The main features of the unit of Figs. 3 and 4 revolve about the truss construction employed over and across the deep central pit whereby to provide or afford support through the medium of the rising column or truss support hollow pier for a raking mechanism for the outlying floor of intermediate elevation and for a raking mechanism for the central pit. Instead of a raking mechanism of the specific form for the unit of Figs. 1 and 2, it will be noted that any other form of central raking mechanism can be employed of which there are outwardly-extending rake carrying arms which are turnable about a set of the vertically-extending main central axial line.

The tank or basin has associated therewith any suitable type of feed supply and feed distributing means and, of course, any suitable type of outflow means whereby liquid supernatant can be progressively released as required and passed from the tank or basin.

The truss or beam members individually numbered as 218 and collectively designated as 221 may be embodied in diverse forms for supporting the hollow pier or column 222. In the construction shown, the radially-extending beams or truss members 218 include four longitudinals generally and provided by commercially rolled structural shapes, to wit, by members 231, 232, 233 and 234 arranged in outwardly converging relationship with respect to each other, each said truss member is made so as to include two upper outwardly-converging members 231 and 232 and two lower outwardly-converging members 233 and 234 so arranged that of the two sets of side members thus resulting and provided thereby, the side members 231 and 233 outwardly and the side members 232 and 234 upwardly converge. These several and longitudinal members are connected together in rigid formation by top, bottom and side diagonals, cross-members and uprights, to wit, by such diagonals as 235 horizontal cross-members 236 and vertical cross-members or uprights 237. The carrying inner members of these truss members referred to are connected together as at 238 and 239 and to the lower portion of the cylindrical column or cage 222.

Fig. 13 has been incorporated to show details of a form of construction by which a set of long large rakes 224 can be driven for effecting a raking of the high outlying floor section 214 of the form of construction illustrated by Figs. 3 and 4. In connection with this particular set of rakes, they are mounted so as to have swinging action in an upward and outward direction, particularly as to the outer ends thereof, upon an abnormally heavy load being encountered during the raking operation. The construction and mounting of this set of rakes from a central carrying cage therefor is illustrated in and by the Scott Patents Nos. 2,122,384 and 2,122,385, both granted June 28, 1938. The liftable type of rake structure which is employed for raking the low central portion of the arrangements of Figs. 3 and 4 follows the teaching of the liftable rake mechanism shown and described in connection with the form of apparatus of Figs. 1 and 2. By Figs. 1 and 2 it will be noted that a single motor M, with suitable speed-reducing and power transmission mechanism, is employed for effecting the slow turning movement of the rake mechanism of said figures. The motor M and speed-reducing mechanism SR of Fig. 13 accomplish a like purpose and in an analogous manner the imparting of a slow but powerful turning movement for effecting the turning of the mechanisms embodying the long rake carrying arms 224 over and along the outlying area of the form of apparatus shown in Figs. 3 and 4. The rake and turning mechanism for the smaller set of rakes in the lower central portion of the apparatus in the form of Figs. 3 and 4 employ the same style of power transmission mechanism and the same type of hydraulic lifting mechanism as that employed for effecting the turning and lifting movements for the rakes disclosed in connection with the turning of the rakes of Figs. 1 and 2. By means of the like reference characters one will readily realize the location of the structural parts illustrated by Fig. 13 when brought into associated relationship with Fig. 4. It is sufficient, however, to note that in Fig. 13 an upright portion or stationary member 24 is carried on a stationary part of the member 51 and that the torque tube 71 of Fig. 13 derives its turnable carrying support from the driven gear wheel 252 whereby this torque member 71 operates at constant elevation while being turned. The bull wheel or driven gear 252 of Fig. 13 is actuated from an auxiliary motor AM and there is a speed-reducing mechanism SR that includes as a part thereof a final drive gear 254 having teeth that mesh with the external gear teeth on the bull wheel 252 whereby the latter is a driven member which in turn actuates the torque tube 71 that functions at constant elevation.

This auxiliary motor AM with associated speed-reducing mechanism SR is carried on a top housing or top gear casing member 255 which serves as a stationary type of support for the hollow depending tube 43 that is disposed concentric with the axis about which the rake mechanisms turn. This tube 43 is of stationary elevation and provides carrying support for the stationary lifting cylinder 46 of the expansible and contractible lifting means 40. This tube 43 is fixedly secured in place and has a T-shaped pipe fitting 104 into which pressure fluid is delivered by pipeline 103. From this T-shaped fitting or pipe connection 104 the released outflow liquid can pass from the expansible and contractible lifting means through the line 105. It will be manifest that the liquid supplied to this tube 43 and the release of liquid passing from the tube 43 is embodied in a pressure supply and pressure release system functioning according to the disclosure of the system described in connection with the form of apparatus illustrated in and by Figs. 1 and 2.

From that which has preceded it is believed that further description of the operation of the parts and members referred to are unnecessary at this time.

What is claimed is:

1. Apparatus for clarifying liquids having solids in suspension therein comprising a settling basin for a main body of liquid to be clarified, equipped with a main bottom section for receiving solids settling thereupon, a marginal wall rising therefrom, an influent supply means, a supernatant liquid effluent overflow means, a depressed section extending below the main section and providing a pit for receiving settlings impelled thereto; sediment-discharge means leading from said pit; rotatable main raking means operable over and along said main bottom for impelling settlings therefrom for delivery into said depressed section; a rotatable sediment-engaging means turnable about a vertically-extending axis and embodying a depending shaft turnably supported by a bearing at the upper end portion thereof and carrying from the lower end thereof outwardly-extending arms by which sediment-engaging means are carried so as to be functionably disposed within the region overlying the bottom portion of said depressed section; and means for rotating said rotatable main raking means and said rotatable sediment-engaging means; said apparatus being characterized in that it includes a truss construction spanning the upper portion of said depressed section and a rising column structure carrying a supporting bearing from which a portion of at least one of said rotatable means derives support, said truss construction having a plurality of truss members disposed so that the outer ends thereof derive support from that portion of the settling basin in the immediate region whereat the main bottom section and the upper portion of the depressed section join, said truss members in plan being so arranged that open sediment-transfer area is left between the outer end portions thereof whereby impelled and transferred settlings from the main bottom section can pass therethrough into the depressed section, said column structure having a rigid connection with the truss members of the truss construction, the outwardly-extending arms at the lower end of said shaft having operating extent under the truss members and within the sediment-receiving area below said truss members.

2. Apparatus according to claim 1, in which the truss members are three in number and in plan are symmetrically arranged.

3. Apparatus according to claim 1, in which the depending shaft and arms carried thereby are liftable for positioning according to operating requirements.

4. Apparatus according to claim 1, in which the column construction carries a main supporting bearing and by and from which the main raking mechanism derives support and is turnably mounted.

5. A sedimentation unit wherein an ever-changing body of liquid-solids suspension is detained while undergoing treatment therein, said unit comprising in combination a liquid-holding receptacle embodying a main bottom section of intermediate elevation and provided with an inwardly disposed opening downwardly toward which the floor portion of said bottom section slopes, a marginal wall rising from said bottom section, an inner cylindrical wall connected to and extending downwardly from the inner edge portions of said bottom section, and a lowermost floor section extending inwardly and downwardly from the low end portion of the inner cylindrical wall and therewith completing a pit section for the receptacle; members constituting radial truss members of which the outer ends are firmly connected to that portion of the receptacle whereat the inner margin of the main bottom section and cylindrical wall are joined; a rising hollow column of which the lower end is rigidly connected and in turn connects the inner portions of said truss members whereby the truss members and the column thus connected and carried thereby complete a rigid truss structure spanning the upper portion of the pit but leaving between the truss members area for the passage of sedimented material from the main bottom portion for delivery into said pit and also leaving clear vertical area between the lowermost floor section of the pit and the under side of said truss members; means for feeding and delivering liquid-solid suspension into a region of the receptacle above said main bottom portion; means for passing supernatant liquid as outflow from the upper interior portion of said receptacle; sediment discharge means for passing sedimented material from a low region within said pit; rotatable main sediment-impelling means suitably mounted with respect to the receptacle and turnable about a vertically-extending axis and disposed for impelling settled solids from diverse sections of the main bottom portion for delivery into the pit; means for actuating said main sediment-impelling means; rotatable sediment-raking means suitably supported with respect to the receptacle, which last mentioned means includes a vertical rake arm carrier extending downwardly within said column; rake arms extending from the lower end of said carrier outwardly within the region below the truss members; a rotatable torque tube of constant elevation extending downwardly within the hollow column and about said carrier; and means for imparting turning movement from the torque tube to said rake arms whereby as and when the torque tube is turning said rake arms are turning in any of the several diverse positions of elevation therefor and are available for impelling sedimented material within the pit towards an intake end of the sediment-discharge means, at least a part of said rotatable means deriving support from said hollow column; and means for turning the torque tube whereby the sediment-raking means embodying the same is turned about the vertically-extending axis.

6. A sediment-raking mechanism of the class described adaptable for operating in a liquid holding basin and which when installed in operative position with respect thereto comprises in combination and in operative relationship rake arms horizontally turnable as a set about a vertically-extending axial line and in plan symmetrically arranged; a vertically-extending liftable rake-arm carrier having carrying support therefor applied at the upper portion thereof and embodying a depending member functioning under tension from the lower portion of which said rake arms are carried so as to extend outwardly therefrom; a suitably supported vertically-extending power-transmission member concentrically disposed with respect to said liftable rake-arm carrier; motivating means for imparting horizontal turning movement to the upper end of said power-transmission member whereby a depending section of the latter functions as a depending power-transmission member under torsional strain; outwardly-extending relatively-stiff power-transmission arms corresponding in number to the aforementioned rake arms and vertically positioned with respect to the latter; hinge means for the inner end of each said power-transmission arm by which said arm is pivotally connected to a lower portion of the depending power-transmission member; guiding means between the upper end portion of the depending power-transmission member and the upper end portion of the depending member of the rake-arm carrier whereby to maintain the upper portions of said depending members in concentric relationship with respect to each other; of which said depending members one functions as an inner member while the other functions as an outer member; suitably supported lifting means for raising said rake-arm carrier by forces applied to the upper portion of the latter; and connecting means at and for the outer end of each power-transmission arm by which each power-transmission arm is connected to a corresponding rake arm with which it is associated whereby to permit outward movement of the outer ends of the several power-transmission arms relative to the rake arms driven thereby; said sediment-raking mechanism being characterized (a) in that as the inner and outer concentric members thus provided by the concentrically disposed vertically-extending power-transmission member and the depending liftable rake-arm carrier, the inside diameter of the outer member is substantially longer than the outside diameter of the inner member; (b) in that beyond the employment of the guiding means which is defined as being disposed between the upper end of the vertically-extending power-transmission member and the upper portion of the liftable rake-arm carrier there is a deliberate omission of any interposed steady bearing; (c) in that the rake arms extending outwardly from said carrier are three in number and in plan are symmetrically arranged; and (d) in that for a continued substantial concentricity as between the lower portions of said inner and outer members reliance is made upon an attainable locking rigidity realizable through the medium of the hingedly mounted relatively stiff power-transmission arms corresponding in number to and overlying the three rake arms which in plan have symmetrical arrangement.

7. A sediment-raking mechanism adaptable for employment in conjunction with a settling tank with which there is an associated stationary means for supporting a sediment-raking mechanism when the latter is in operative position with respect to the tank, which said sediment-raking mechanism comprises in combination a main turntable construction of constant elevation having a stationary base and a rotatable main turntable mounted on said base so as to have uni-directional horizontal turning movement about a vertically-extending axial line, and of which the base when in operative position derives carrying support from said associated stationary means; motivating means for imparting forces whereby said rotatable main turntable has turning movement about the vertical axial line; an auxiliary turntable construction comprising a liftable base and an auxiliary turntable mounted on said liftable base in a manner whereby there is provision for horizontal turning movement of the auxiliary turntable about a vertical axial line substantially in alignment with said axial line of the main turntable; lifting means for supporting and raising said liftable base; a rake-arm carrier comprising a depending inner shaft functioning under tension and deriving support from said auxiliary turntable; rake-arms extending outwardly and deriving support from the lower portion of said shaft; a rotatable drive member embodying a depending outer tubular member serving as a torque tube functioning under torsional strains the upper end portion of which is connected to said main turntable so as to be driven thereby and also having connected to the lower end thereof an outwardly-extending means for affording support for the power-transmission arms hereinafter referred to; outwadly-extending power-transmission arms V-shaped in plan and disposed that the vertex of the V is outermost; means providing hinge connection between said outwardly-extending means and the spaced inner ends of the V portion of said power-transmission arms; a connecting link for each power-transmission arm and rake-arm corresponding thereto as to each of which links one end thereof, namely, the upper end is connected to the outer end of the power-transmission arm while the lower end is connected to the corresponding rake arm; said sediment-raking mechanism being characterized in that the outwardly-extending means referred to includes an inner triangular member; a larger outer triangular member; and three downwardly- and outwardly-extending tension rods; each of which triangular members is formed of three horizontals of equal length of which the ends of the adjacent horizontals are connected to form an equilateral triangle, of which the central portion of each horizontal of the inner triangular member is rigidly connected to said depending tubular member, of which the central portion of each horizontal of the outer triangular member is rigidly connected to a corresponding outer vertex portion of the inner triangular member, of which the upper ends of the tension rods are connected to said depending tubular member, while the outer lower end of each rod is connected to a corresponding outer vertex portion of the outer triangular member and of which each horizontal of the outer triangular member carries horizontally spaced hinge elements arranged so that the pintle axis thereof extends horizontally and serves as a part of the hinge connection by which the spaced inner end portions of corresponding V-shaped power-transmission members are carried by and thus driven from said depending tubular member.

8. A sediment-raking mechanism adaptable for employment in conjunction with a settling tank with which there is associated stationary means for supporting a sediment-raking mechanism when the latter is in operative position with respect to the tank and constructed according to claim 7, in which the end connected horizontals of the inner triangular members are provided by channel members of which the flange portions extend inwardly and in which the horizontals of the larger outer triangular members are provided by tubes.

9. A sedimentation unit comprising in combination a tank having a bottom and a marginal wall rising therefrom, means for supplying a liquid-solids mixture to the tank, supernatant liquid withdrawal means leading from the upper portion of the tank, a sediment-discharge means leading from said bottom, supporting means fixedly positioned with respect to the tank, and in operative relationship with respect to the foregoing a horizontally-turnable sediment-raking mechanism for impelling sedimented material towards the intake section of said sediment-discharge means; which said raking mechanism comprises in combination a main turntable construction of constant elevation having a stationary base carried by said supporting means and a power-actuated main turntable mounted on said main stationary base so as to have uni-directional horizontal turning movement about a vertically-extending axial line; motivated means for imparting said turning movement to said turntable; an auxiliary turntable construction comprising a liftable base and an auxiliary turntable mounted upon said liftable base in a manner whereby there is provision for horizontal turning movement of the auxiliary turntable about a vertical axial line substantially in alignment with said axial line of the main turntable; lifting means for supporting and raising said liftable base; a depending rake-arm carrying shaft functioning under tension and deriving support from said auxiliary turntable; rake-arms extending outwardly and deriving support from a lower portion of said carrier; a depending tubular drive member functioning under torsional strains the upper end portion of which is connected to said main turntable so as to be driven thereby as the main turntable is turned and the lower end of which is equipped with outwardly-extending means for affording driving support for power-transmission arms; outwardly-extending power-transmission arms V-shaped in plan and disposed with the vertex of the V outermost; means providing for each said power-transmission arm hinge connections between the spaced inner ends of V-portions thereof and said outwardly-extending means; means by which the outer end of each power-transmission arm is connected to a corresponding rake arm in a manner that permits upward and outward movement thereof with respect to the rake arm to which it corresponds but which connection is such as to prevent lateral horizontal movement between the outer end of such power-transmission arm and the rake arm to which it is connected; said outwardly-extending means at the lower end of the tubular drive member being provided by an outer triangular structure embodying three end connected horizontally-extending hinge supporting members, outwardly-extending spacer members of which the inner ends are connected to the tubular drive member while the outer ends are connected to said triangular structure and enclosed bracing members of which the inner ends are connected to the tubular drive member and the outer ends are connected to the outer triangular structure, each of said hinge supporting members being equipped with hinges that provide the hinge connections for the spaced inner ends of the V portions of the power transmission corresponding thereto.

10. A sedimentation unit comprising in combination a tank having a bottom and a marginal wall rising therefrom, means for supplying liquid-solids mixture to the tank, supernatant liquid withdrawal means leading from the upper portion of the tank, a sediment-discharge means leading from said bottom, supporting means fixedly positioned with respect to the tank, and in operative relationship with respect to such tank; a horizontally-turnable sediment-raking mechanism positioned for impelling sedimented material towards the intake section of said sediment-discharge means; which said raking mechanism comprises in combination a main turntable construction of constant elevation having a stationary base carried by said supporting means and a power-actuated main turntable mounted on said stationary base so as to have uni-directional horizontal turning movement about a vertically-extending axial line; motivated means for imparting said turning movement to said turntable; an auxiliary turntable construction comprising a lifting base and an auxiliary turntable mounted upon said liftable base in a manner whereby there is provision for horizontal turning movement of the auxiliary turntable about a vertical axial line substantially in alignment with said axial line of the main turntable; lifting means for supporting and raising said liftable base; a depending rake-arm carrying shaft functioning under tension and deriving support from said auxiliary turntable; rake-arms extending outwardly and deriving support from a lower portion of said rake-arm carrying shaft; a depending tubular drive member functioning under torsional strains the upper end portion of which is connected to said main turntable so as to be driven thereby as the main turntable is turned and the lower end of which is equipped with outwardly-extending means for affording driving support for power-transmission arms; outwardly-extending power-transmission arms V-shaped in plan and disposed with the vertex of the V outermost; means providing for each said power-transmission arm hinge connections between the spaced inner ends of V-portions thereof and said outwardly-extending means; a swingable connection link for each power-transmission arm and a rake arm corresponding thereto of which one end of the link is connected to the outer end of the power-transmission arm while the other end portion of the link is connected for imparting turning movement to the corresponding rake arm in diverse positions of elevation therefor; said outwardly-extending means at the lower end of the tubular drive member functioning under torque strains being provided by an inner triangular structure embodying three end connected inner horizontally-extending members, an outer triangular structure embodying three end-connected outer horizontally-extending hinge supporting members and three downwardly- and outwardly-extending tension members of which the upper ends are connected to the tubular member while the lower ends are connected to the corresponding connected ends of said outer horizontally-extending hinge supporting members, and for each hinge-supporting member hinges having horizontally-extending pintle axes and as to which said hinges there are carried from the hinge-supporting members and in turn are connected to the spaced inner ends of the V-portions of the outwardly-extending axis to provide the pivotal connections referred to.

11. A sedimentation unit comprising in combination a tank having a bottom, a marginal wall rising from said bottom, means for supplying liquid suspension to the tank, means for passing supernatant liquid from the tank, and sediment-discharge leading from said bottom; supporting means fixedly positioned with respect to the tank for supporting a sediment-raking mechanism; a horizontally-turnable sediment-raking mechanism comprising a main turntable construction having a stationary base carried by said supporting means and an actuatable main turntable having a central opening extending therethrough mounted on said main stationary base so as to have uni-directional horizontal turning movement about a vertically-extending axial line; motivating means for imparting turning movement to said main turntable; an auxiliary turntable construction comprising a liftable base and an auxiliary turntable mounted upon said liftable base whereby there is provision for turning movement of the auxiliary turntable about a vertical axial line substantially in alignment with the axial line of the main turntable; means for actuating said auxiliary turntable; lifting means for raising said liftable base; a depending rake-arm carrier embodying an inner vertically-extending shaft functioning under tension and deriving support from said auxiliary turntable; rake-arms extending outwardly and deriving support from a lower portion of said shaft; a depending power-transmission member providing a tube surrounding but spaced from said shaft and functioning under torsional strains, the upper end portion of which tube is connected to said main turntable so as to be driven thereby as the main turntable is turned and equipped at the lower end portion thereof with outwardly-extending means affording support for the power-transmission arms hereinafter referred to; outwardly-extending power-transmission arms V-shaped in plan and disposed with the vertex of the V lowermost and outermost; hinge means for each of said power-transmission arms disposed with the pintle axes extending horizontally and serving as connecting means between the spaced ends of the V-portion thereof and said outwardly-extending means; and means by which the outer end of each power-transmission arm is connected to the corresponding rake arm in a manner that permits upward and outward movement thereof with respect to the rake arm to which it corresponds but which connection is such as to oppose lateral horizontal movement between the outer end of such power-transmission arm and the rake arm to which it is connected, which rake arms are three in number and in plan are symmetrically arranged.

12. A unit according to claim 11 in which the inner vertically-extending shaft of the rake-arm carrier has at the lower end thereof three outwardly-extending rake-arm carrying elements each of which includes a horizontally and outwardly-extending member and an outwardly- and downwardly-extending member of which the inner ends of said members are connected as by welding to the depending shaft, while the outer companion ends thereof are connected as by welding and carry thereupon a pair of rake-arm securing flanges having arm-engaging faces which in plan view are disposed at 120 degrees with respect to each other and afford means to which a lower inner end portions of each of two adjacent rake-arms are connected; said carrying elements also including three upper connecting members welded to the shaft and of which each provides a means to which the upper inner end portion of a rake arm corresponding thereto can be connected whereby as the result of the construction specified each rake arm is rigidly securable to the shaft and extends therefrom so that when thus secured said rake arms in plan are symmetrically arranged and extend in directions 120 degrees with respect to each other.

13. A sedimentation unit wherein an ever-changing body of liquid-solids suspension is detained while undergoing treatment therein, said unit comprising in combination a liquid-holding receptacle embodying an upper marginal wall of which the top is at a higher elevation than the top of an inwardly spaced intermediate marginal wall, an effluent outflow means leading from the space between the marginal wall and the inwardly spaced intermediate marginal wall, a main floor portion of intermediate elevation extending inwardly from the lower portion of the marginal wall to the upper portion of the intermediate wall, a low floor portion extending inwardly from a lower portion of the intermediate wall for completing the liquid-holding section and thus providing with the intermediate wall a pit section for the unit; members constituting radial truss members of which the outer ends are firmly connected to that portion of the receptacle whereat the inner margin of the main floor portion and the upper portion of the intermediate wall merge and thus join each other; a rising hollow column of which the lower end is rigidly connected to and in turn connects the inner portions of said truss members whereby said truss members and the column thus connected and carried thereby complete a rigid truss structure spanning the upper portion of the pit section but leaving between the truss members thereof area for the passage of sedimented material passing from the main floor of intermediate elevation for delivery into said pit section and also leaving clear vertical area between the low floor portion of the pit section and the underside of said truss members; means for feeding and delivering liquid-solids suspension into a region of the receptacle above said main floor portion; means for passing sedimented material from a low region within said pit section; rotatable sediment-impelling means turnable about a vertically-extending axial line, suitably mounted with respect to said receptacle, and provided for impelling settled solids from diverse sections of the main floor portion of intermediate elevation for delivery into said pit section; means for rotating said sediment-impelling means; suitably supported sediment-raking means embodying a vertical rake-arm carrier extending downwardly within said column; and rake means carried from the lower end of said carrier and extending outwardly within the region below the truss members and provided whereby to impel sedimented material within the pit section toward an intake section of the sediment-discharge means.

14. An apparatus comprising a receptacle for receiving clarified liquids having solids in suspension into which influent to be subjected to a settling operation is delivered into an ever-changing main body of liquid within a tank thereof having a main floor of intermediate elevation and a depressed section extending downwardly from said main floor and providing a pit for receiving settlings impelled thereinto from said main floor; of which the bottom portion of said depressed section provides a floor of low elevation with sludge sump therein; means operable over and along said main floor for impelling settlings therefrom for delivery into said depressed section; sediment-discharge means having an intake end leading from said sludge sump; sediment-engaging means having a set of vertically positionable rotatable rake-carrying arms equipped with sediment-impelling means and when turned are functionally operable in closed paths for impelling settlings from and along the floor of said depressed section toward and into said sump; a suitably supported vertically-extending and vertically-positioned shaft carrying from the lower end thereof said set of outwardly-extending rake-carrying arms, and rotatable means for imparting turning movement of said set of rake-carrying arms about said vertical axis; said apparatus being characterized in that it includes a truss construction spanning the upper portion of said pit and embodying a plurality of truss members disposed so that the outer ends thereof derive support from that portion of the apparatus in the immediate region whereat the main floor of intermediate elevation and the upper edge portion of the depressed section join, which truss members are so arranged that open sediment-transfer area is left between the outer ends of said truss members whereby the impelled and transferred settlings can drop from the inner edge of the floor of intermediate elevation into said depressed section; and means providing a hollow supporting column having a rigid connection with said truss members, and also further characterized in that said vertically-extending and vertically-positionable shaft extends downwardly through said hollow support column and in that the rotatable outwardly-extending rake-carrying arms are functionally disposed within the region below said truss member.

CHARLES HAROLD SCOTT.

REFERENCES CITED

The following references are of record in the file of this patent:

UNITED STATES PATENTS

| Number | Name | Date |
|---|---|---|
| 1,702,192 | Bloomfield et al. | Feb. 12, 1929 |
| 1,702,193 | Bloomfield | Feb. 12, 1929 |
| 1,960,707 | Logue et al. | May 29, 1934 |
| 2,122,384 | Scott | June 28, 1938 |
| 2,126,884 | Hardinge | Aug. 16, 1938 |
| 2,360,817 | Scott | Oct. 17, 1944 |
| 2,418,973 | Hardinge | Apr. 15, 1947 |